(12) United States Patent
Naruse

(10) Patent No.: US 7,894,097 B2
(45) Date of Patent: Feb. 22, 2011

(54) IMAGE FORMING APPARATUS WITH CONTROLLER TO CONTROL OPERATION BASED ON OPEN OR CLOSED STATE OF UPPER PORTION OF APPARATUS

(75) Inventor: Kenichi Naruse, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1027 days.

(21) Appl. No.: 11/427,661

(22) Filed: Jun. 29, 2006

(65) Prior Publication Data

US 2007/0002396 A1 Jan. 4, 2007

(30) Foreign Application Priority Data

Jun. 30, 2005 (JP) ............................. 2005-191166

(51) Int. Cl.
*G06K 15/22* (2006.01)
*G06F 3/12* (2006.01)
*G06K 15/10* (2006.01)
(52) U.S. Cl. ........................ 358/1.4; 358/1.1; 358/1.5
(58) Field of Classification Search ................ 358/1.1, 358/1.9, 1.11–1.18, 1.4, 1.5, 1.6
See application file for complete search history.

(56) References Cited

U.S. PATENT DOCUMENTS

| 5,459,554 | A | * | 10/1995 | Shiraishi | ...................... | 399/43 |
| 2002/0118403 | A1 | * | 8/2002 | Kameyama et al. | ......... | 358/474 |
| 2005/0030517 | A1 | * | 2/2005 | Todome | ...................... | 355/407 |
| 2005/0175371 | A1 | * | 8/2005 | Kunugi | ...................... | 399/107 |
| 2005/0271411 | A1 | * | 12/2005 | Shibaki et al. | ................ | 399/82 |

FOREIGN PATENT DOCUMENTS

| JP | 5-197225 A | 8/1993 |
| JP | 5-333988 A | 12/1993 |

* cited by examiner

*Primary Examiner*—Thierry L Pham
(74) *Attorney, Agent, or Firm*—Banner & Witcoff, Ltd.

(57) ABSTRACT

An image forming apparatus includes an upper portion that is openable/closeable relative to a main body of the imaging apparatus and an operation panel provided on the upper portion. The receiving unit is configured to receive an operational instruction input by a user through an operation panel. A sensor detects an open/close state of the upper portion. A controller is configured to control operation of the image forming apparatus, wherein in response to receiving an open state signal, the controller at least one of invalidates an operational instruction received by the operation unit within a predetermined period prior to receiving the open state signal and terminates an operation being executed.

18 Claims, 8 Drawing Sheets

US 7,894,097 B2

IMAGE FORMING APPARATUS WITH CONTROLLER TO CONTROL OPERATION BASED ON OPEN OR CLOSED STATE OF UPPER PORTION OF APPARATUS

CROSS-REFERENCE TO RELATED APPLICATION

This application claims priority from Japanese Patent Application No. 2005-191166, filed on Jun. 30, 2005, the entire subject matter of which is incorporated herein by reference.

FIELD

Aspects of the invention relate to an image forming apparatus such as an MFD (Multi Function Device) having an upper portion openably and closeably provided on the main body of the image forming apparatus.

DESCRIPTION OF RELATED ART

Conventionally, there has been know an image forming apparatus in which a printer configured to print images on recording sheets and a scanner configured to scan images formed on original sheets are integrally provided. In such an image forming apparatus, the scanner is typically used as a flatbed scanner, and in order to facilitate opening/closing of a document cover which is used to cover the original to be scanned placed on a scanning position, the scanner is typically provides on the printer. Further, the operation panel of the image forming apparatus is typically provided on a front face and at an upper portion thereof so that a user can operate the operation unit and/or see a display thereof. Therefore, in an apparatus having an integrally formed printer and scanner, the operation panel is typically provided on the front face of the scanner.

In the conventional image forming apparatuses as described above, there are ones which are configured such that the scanner is openable/closable provided on the printer. The printer is generally formed with an opening from which consumable components such as toner cartridge, photosensitive drum and the like are exchange or eliminate paper jam. Such an opening of the printer should be closed with a cover when the printer unit is normally used. The image forming apparatus having the scanner above the printer is configured such that the opening described above is formed on an upper side of the printer, and the scanner is provided to cover the opening. When the consumable components are exchange or a paper jam is eliminated, the scanner is moved upwards to expose (access) the inside of the printer to the user.

If the image forming apparatus is configured as above, when the user moves upwards the scanner while holding the front portion of the scanner, he may unintentionally touch the operation panel and operate some keys. The operation panel is typically provided with many operation buttons for inputting various commands to the scanner and printer. With the recent trend of multi-functionalization of this type of device, the number of the operation keys has become relatively large in number, and therefore an area occupied the operation unit has become relatively wide. Therefore, there is an increased likelihood that a user may touch the operation keys unintentionally when lifting upwards the scanner.

SUMMARY OF THE INVENTION

Illustrative aspects of the invention an image forming apparatus with an upper portion formed with an operation panel, and is configured such that an operation caused by an unintended user input to the operation panel can be prevented.

BRIEF DESCRIPTION OF THE DRAWINGS

Reference is made to the attached drawings, wherein elements having the same reference numeral designations represent like elements throughout, and wherein.

DETAILED DESCRIPTION

General Overview

Figure 1:
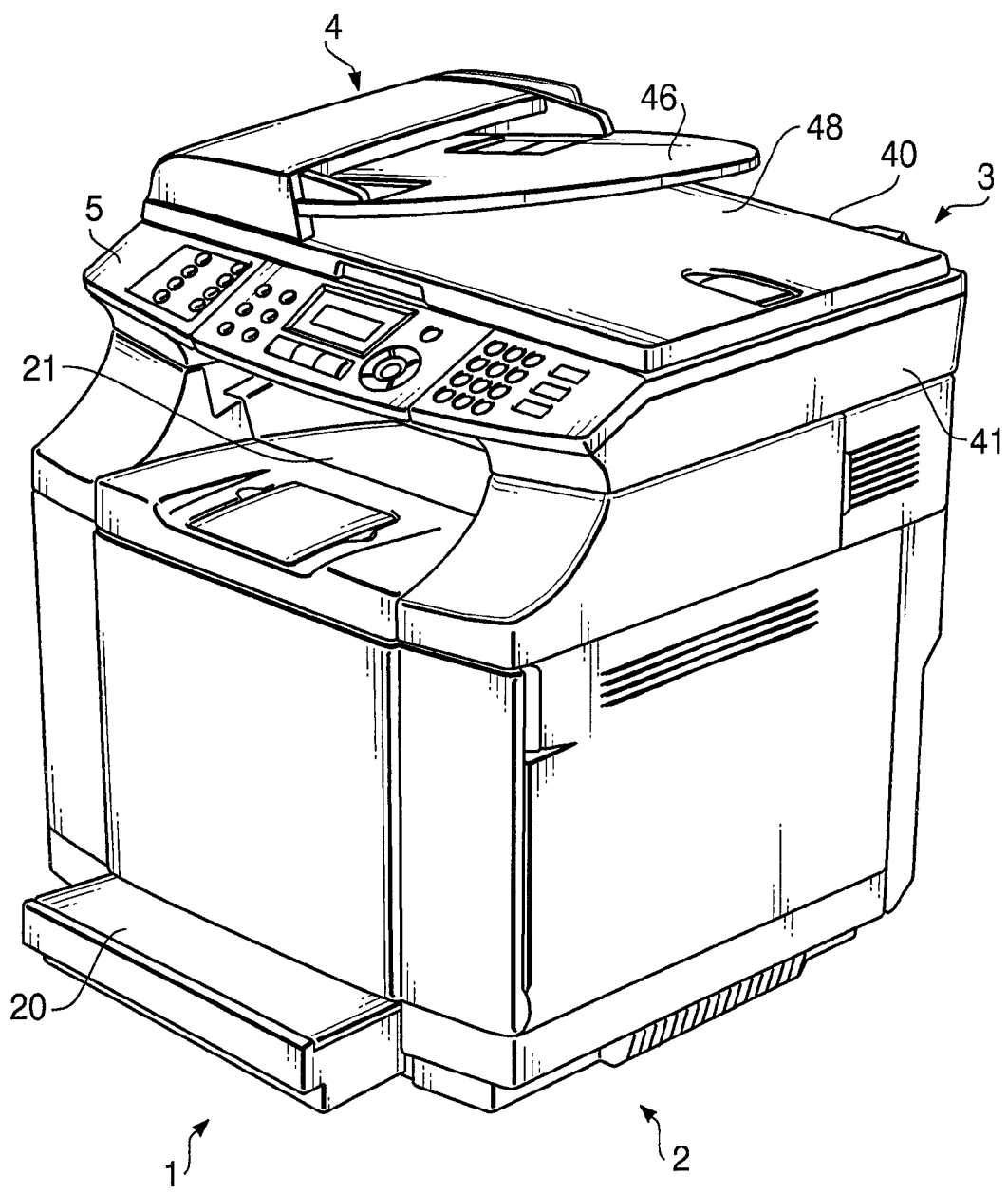
FIG. 1 is a perspective view of an MFD (Multi Function Device) according to aspects of the present invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, floppy drives, permanent storage, and the like.

According aspects of the invention, there is provided an image forming apparatus, which includes an upper portion that is openable/closeable relative to a main body of the image forming apparatus. An operation panel is provided to the upper portion. Further, a receiving unit is provided, which is configured to receive an operational instruction input by a user through the operation panel, a sensor that detects an open/close state of the upper portion. A controller is coupled to the sensor and the receiving unit and configured to control operation of the image forming apparatus. In response to receiving an open state signal, the controller at least one of invalidates an operational instruction received by the receiving unit within a predetermined period prior to receiving the open state signal and terminates an operation being executed.

According to aspects of the invention, there is provided an image forming apparatus, which is provided with an upper portion that is openable/closeable relative to a main body of the image forming apparatus, an operation panel provided on the upper portion. Further, there is provided a receiving unit configured to receive an operational instruction input by a user through the operation panel. A sensor is provided, which detects an open/close state of the upper portion, and a controller coupled to the sensor and the receiving unit and configured to control operation of the imaging apparatus. In response to receiving an open state signal from the sensor, the controller invalidates an operational instruction received by the receiving unit, and when a predetermined period has passed after the controller received a close state signal from the sensor, the controller accepts an operational instruction received by the receiving unit.

The controller may accept the operational instruction when a predetermined period has elapsed after receiving a close state signal.

The upper portion may include an image scanner configured to scan an image of document sheet and document sheet sensor configured to detect presence/absence of the document sheet to be scanned, and when the controller receives a signal indicating presence of the original sheet from the document sheet sensor, the controller accepts an operational instruction received by the receiving unit to start reading the image on the original sheet during a predetermined period after the controller receives the open sate signal.

The controller may be configured to accept a stop operational instruction from the operation unit regardless of a state detected by the sensor.

The operation panel may be provided on a distal end portion of the upper portion.

The operational instruction received by the receiving unit may include an instruction to form an image.

The image forming apparatus may further include a warning unit that generates a warning sound when the controller invalidates the operational instruction received by the receiving unit.

Illustrative Aspects

Hereinafter, referring to accompanying drawings, an MFD (Multi Function Device) 1 according to illustrative aspects of the invention will be described.

FIG. 1 is a perspective view of the MFD 1 (as an example of an image forming apparatus) according to aspects of the present invention. The MFD 1 is a device having multiple functions in a single body (i.e., multiple devices are integrally implemented in a single body). According to illustrative aspects, the MFD 1 has a printer 2 in a lower portion and a scanner 3 in an upper portion thereof, The MFD 1 is capable of functioning a printer, a scanner, a copier, and the like. It should be noted that functions other than the printer function are optional functions. For example, the scanner 3 may be removed and an operation panel may be provide on an upper surface of such a printer 2. Alternatively, further functions may be implemented in the MFD 1. For example, the MFD 1 may include a facsimile function. The scanner 3 can be opened and closed relative to the printer 2 so that components inside the printer 2 may be accessed by the user with the scanner 3 being opened.

The MFD 1 may be used as a printer for an external device (not shown) such as a computer. Specifically, the MFD 1 may be connected to the computer. Based on print data including image data and/or text data transmitted from the computer, the printer 2 of the MFD 1 prints images corresponding to the received data on recording sheets (e.g., paper). Further, the scanner 3 is capable of scanning an image on an original placed on a predetermined position to generate image data, which may be transmitted to the computer. The MFD 1 also can function as a copier, which scans an image on the original and prints the same without transmitting the image data to the external device. It should be noted that the configuration of the MFD 1 described below is exemplary and the configuration thereof can be modified in various ways without departing from aspects of the invention.

As shown in FIG. 1, the MFD 1 has a substantially rectangular parallelepiped shape. The scanner 3 is arranged on the printer 2 that serves as a main body of the MFD 1. Between the scanner 3 and the printer 2, an opening facing the front side is formed.

An upper surface of the printer 2 serves as a discharge tray 21, while in a bottom of the printer 2, a supply cassette 20 is provided. In the supply cassette 20, a stack of recording sheets P are set. The recording sheets P accommodated in the supply cassette 20 are fed inside the printer 2 one by one, and an image is formed thereon and each sheet is discharged onto the discharge tray 21. The recording sheets P discharged onto the discharge tray 21 can be picked up by the user through the opening formed between the printer 2 and the scanner 3.

Figure 3:
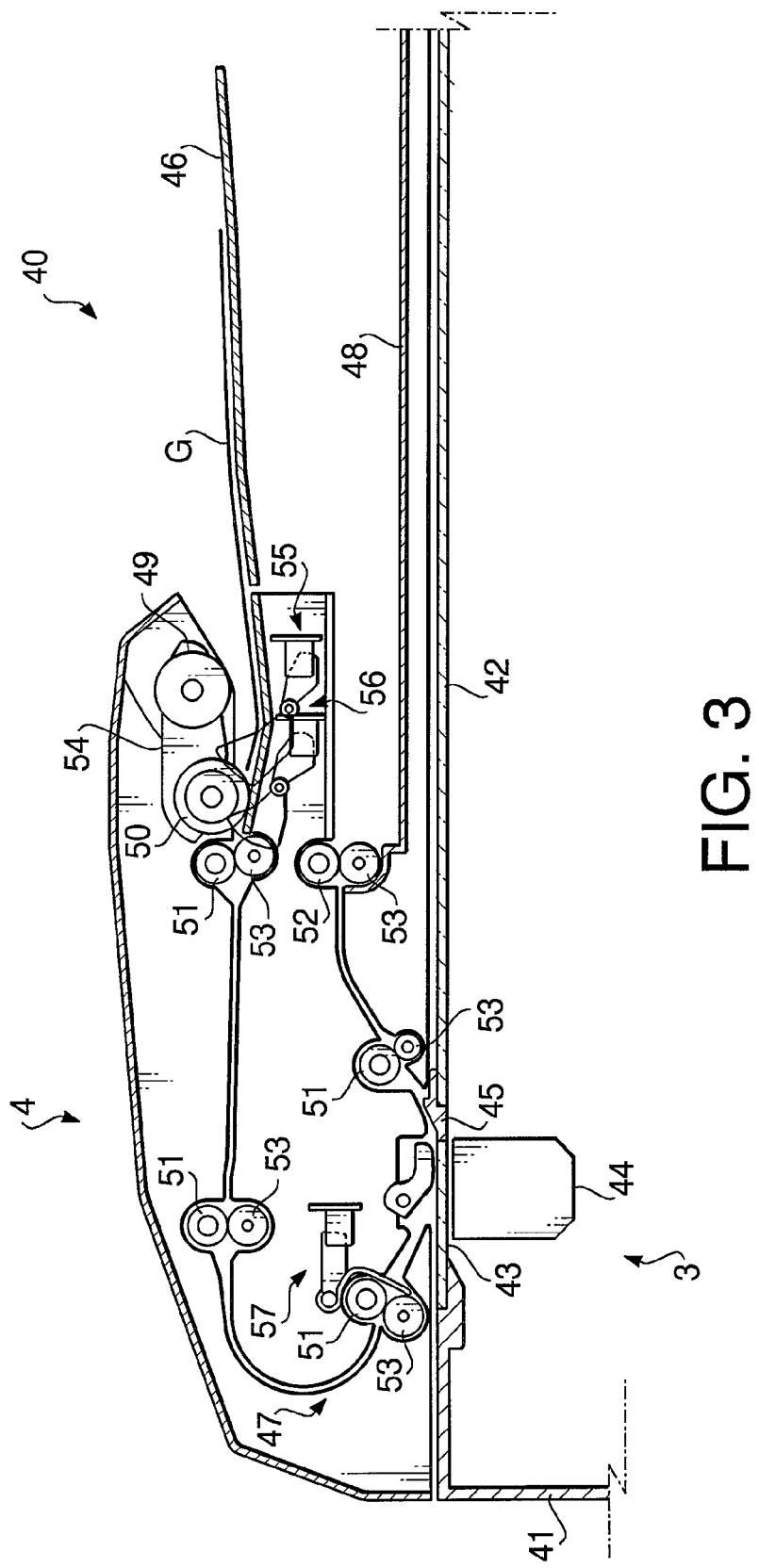
FIG. 3 schematically shows a cross sectional view of main components of a scanner of the MFD according to aspects of the present invention.

The scanner 3 is configured as a flatbed scanner. As shown in FIG. 1 and FIG. 3, the scanner 3 is provided with a document cover 40, and below the document cover 40, a platen glass 42 and an image reading unit 44 are provided. A document sheet G (see FIG. 3) is placed on platen glass 42. Below the platen glass 42, the image reading unit 44 is provided. It is defined that a depth direction (i.e., a direction perpendicular to a plane of FIG. 3) of the MFD 1 is referred to as a main scanning direction for the image reading unit 44. While the image reading unit 44 moves along the document sheet G placed on the platen glass 42, the image on the document sheet G is scanned. It should be noted that, when the original document G is placed on the platen glass 42, the image reading unit 44 is moved to scan the image on the original document G.

An auto document feeder (ADF) 4 is provided on the document cover 40. The ADF 4 automatically feeds document sheets stacked on a supply tray 46 to a discharge tray 48. During transportation of the from the supply tray 46 to the discharge tray 48, as the document passes through a platen glass 43, the image reading unit 44 scans the image on the document sheet. It should be noted that, when the document is placed on the sheet supply tray 46 and fed by the ADF 4 to the discharge tray 48, the image reading unit 44 stays in a fixed position (see FIG. 3), and scans the image on the document sheet G as it passes the platen glass 43.

On a front side upper surface of the scanner 3, an operation panel 5 for operating the printer 2 and the scanner 3 is provided. The operation panel 5 includes various operation keys to input various commands and the like, and an LCD (liquid crystal display). Specifically, the operation keys include a power button for switching ON/OFF the MFD 1, start keys respectively for starting operations of the scanner 3 and the printer unit 2, a stop key for stopping operation of the scanner 3 and the printer unit 2, or stopping a setting operation, a mode button for selecting one of the functions such as the scanner, copier, facsimile and the like, numeric keys for inputting telephone numbers or the number of copies to be made, and other keys for various settings.

When one of such keys of the MFD 1 is depressed, a command corresponding to the depressed key is input to a controller of the MFD 1. On the LCD of the operation panel 5, a current status of the MFD 1 and/or guidance to a user is displayed. The controller controls the operation of the MFD 1 based on the input command which is input as one of the operation keys is depressed. As described previously, the MFD 1 can also be controlled by a command transmitted from an external device (e.g., a computer) via a printer driver or a scanner driver installed in the external device.

Next, the inside structure of the printer unit 2 will be described with reference to FIGS. 1 and 2.

Figure 2:
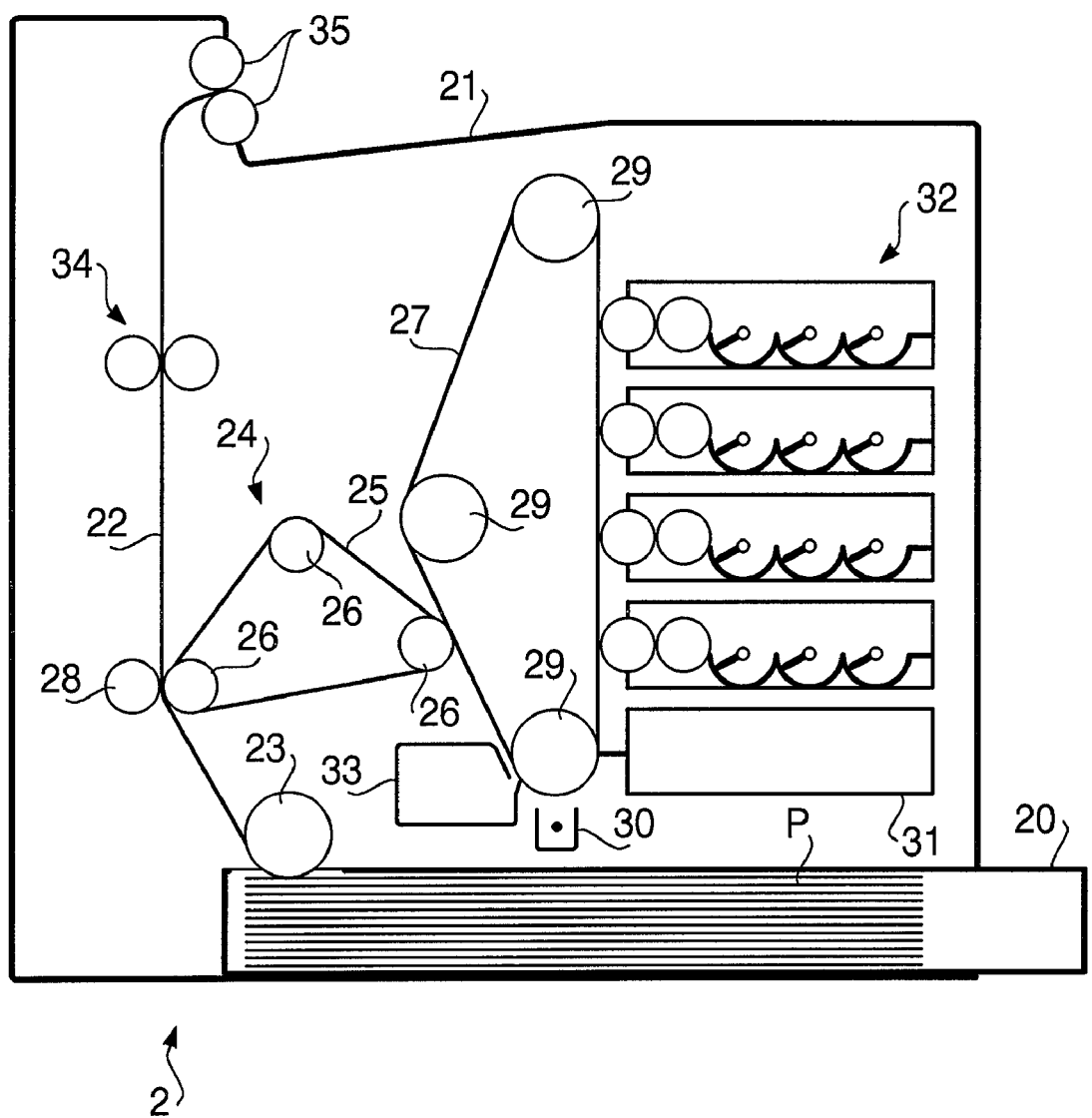
FIG. 2 schematically shows a cross sectional view of main components of a printer unit of the MFD according to aspects of the present invention.

As shown in FIGS. 1 and 2, at the bottom portion of the printer 2, the supply cassette 20 is provided. The supply cassette 20 has thin rectangular parallelepiped shape, and accommodates the recording sheets P therein. The supply cassette 20 is detachably attached to the main body of the printer 2. That is, a user can detach the supply cassette 20 by pulling the same in a rearward direction (i.e., rightward in FIG. 2). In order to set the recording sheet P, the user pushes in the supply cassette 20 accommodating the recording sheet 20 in a frontward direction (i.e., leftward in FIG. 2), thereby the supply cassette 20 is securely attached to the main body of the printer 2.

A sheet teed path 22 is defined from the supply cassette 20 to the discharge tray 21. The sheet teed path 22 is for feeding the recording sheet P. As shown in FIG. 2, the sheet teed path 22 starts at a front end (i.e., left-hand side end in FIG. 2) of the teed cassette 20, extends upward along a rear wall (i.e., a left-hand side vertical wall in FIG. 2) of the printer 2, is curved frontward and communicates with the discharge tray 21.

The main body of the printer 2 is provided with a sheet feed roller 23 at a position facing the front end portion of the supply cassette 20 attached to the main body of the printer 2. Specifically, the sheet feed roller 23 makes contact with the uppermost one of the stacked recording sheets P accommodated in the supply cassette 20. When the sheet feed roller 23 is rotated it makes pressing contact with the top recording sheet P in the supply cassette 20. The top recording sheet P is fed in the sheet feed path 22 by the rotational force of the sheet feed roller 23.

At a portion of the sheet feed path 22 on a downstream side of the sheet feed roller 23, an intermediate transfer unit 24 is provided. The intermediate transfer unit 24 includes an intermediate transfer belt 25 and three belt rollers 26. As the three belt rollers 26 rotate in the same direction, the intermediate transfer belt 25 proceeds. As the intermediate transfer belt 25 proceeds, it contacts a photoreceptor belt 27. A toner image formed on the photoreceptor belt 27 is transferred to the intermediate transfer belt 25. The toner image transferred to the intermediate transfer belt 25 is further transferred to a recording sheet P transporting along the sheet feed path 22 at a position where a charged transfer roller 28 and the intermediate transfer belt 25 supported by one of the belt rollers 26 nip and feed the recording sheet P.

The photoreceptor belt 26 is supported by three belt rollers 29 as shown in FIG. 2. As the belt rollers 29 rotate, the photoreceptor belt 27 proceeds. As the photoreceptor belt 27 proceeds, it is charged, exposed to light forming an image and developed (i.e., toner is applied to a latent image) so that a toner image is formed thereon.

Below the photoreceptor belt 27, a charger 30 provided. The charger 30 charges the surface of the photoreceptor belt 27 at a predetermined voltage by corona discharge. It should be noted that, as the charger 30, any other suitable device such as a contact-type roller charging device or brush charging device may be employed.

On a downstream side of the charger 30 in the proceeding direction of the photoreceptor belt 27, a laser scanner unit 31 is provided. The laser scanner unit 31 scans a laser beam modulated in accordance with image data on the charged surface of the photoreceptor belt 27 so that a latent image is formed thereon. It should be noted that any other exposing device such as a linear LED array and the like may be employed instead of the laser scanner unit 31.

On a downstream side of the laser scanner unit 31 in the proceeding direction of the photoreceptor belt 27, a developing unit 32 is provided. The developing unit 32 includes tour subunits containing cyan, magenta, yellow and black toners, respectively, which are arranged in an up-and-down direction, along the photoreceptor belt 27. Each subunit of the developing unit 32 has a casing made of synthetic resin, which contains toner of a respective color, a developing roller, a supplying roller and the like. Each color toner, which is charged, is supplied to the developing toner by the supplying roller and adhered onto the surface of the developing toner by electrostatic force. Then, the toner is attracted by the electrostatic latent image on the photoreceptor belt 27, thereby a toner image is formed (i.e., the latent image is developed). The toner image formed on the photoreceptor belt 27 is transferred onto the intermediate transfer belt 25, and then transferred to the recording sheet P. In this example, the printer 2 forms a color image using tour colors of toner. It is noted that the invention needs not be limited to the color printer, and it only a monochromatic image is required, the printer 2 may be configured to form a monochromatic image and the developing unit 32 may have only the desired color toner (e.g., black toner).

On the downstream side of a portion where the intermediate transfer belt 25 and the photoreceptor belt 27 contact, a cleaning unit 33 is provided. The residual toner on the photoreceptor belt 27 is removed therefrom by the cleaning unit 33.

On the downstream side of the intermediate transfer belt 25, in the sheet feed path 22, a fixing unit 34 is provided. The fixing unit 34 includes a heat roller and a pressure roller with the sheet feed path 22 therebetween. The fixing unit 34 applies heat and pressure to the toner image transferred on the recording sheet P. The toner image transferred on the recording sheet P is melted by the heat applied by the heat roller, and is fixed onto the recording sheet P as pressed by the pressure roller.

On the downstream side of the fixing unit 34, and at the most downstream side portion of the sheet feed path 22, a pair of sheet discharge rollers 35 are provided. The recording sheet P, on which the toner image has been fixed, is nipped by the discharge rollers 35 and fed to the sheet discharge tray 21 by the rotational force of the pair of sheet discharge rollers 35.

Next, the inside configuration of the scanner 3 will be described in detail with reference to FIGS. 1 and 3.

The scanner 3 is provided on the document placing table 41 such that the document cover 40 is openable/closable. On the document placing table 41, the platen glasses 42 and 43 are arranged such that they are exposed to the upper surface when the document cover 40 is opened. Specifically, when the document cover 40 is opened, the platen glasses 42 and 43 are exposed to outside. When the document cover 40 is closed, the entire upper surface of the document placing table 41 including the platen glasses 42 and 43 is covered. Inside the document placing table 41, the image reading unit 44 is provided to face the platen glasses 42 and 43. The operation panel 5 is provided on the upper portion of the front surface of the document placing table 41.

As previously described, when the original G is placed on the platen glass 42, the scanner 3 is used as an FBS (flat bed scanner). Specifically, when the scanner 3 is used as the FBS, the original G is placed on the platen glass 42 and the image reading unit 44 is driven to move and scan the image. The platen glass 42 is a transparent glass plate. On the upper surface of the document placing table 41, an opening for exposing the platen glass 42 to the image reading unit 44 is formed. This exposed area (i.e., the area defined by the opening formed on the upper surface of the document placing table 41) is an original reading area for the FBS.

The platen glass 43 is provided at an image reading position when the ADF 4 is used to read the image of the original G. The platen glass 43 is an elongated transparent glass plate, and may have a length, in the depth direction of the MFD 1, corresponding to the length, in the main scanning direction, of the image reading unit 44.

Between the platen glass 42 and platen glass 43, a positioning member 45 is provided. The positioning member 45, similar to the platen glass 43, is a rectangular plate member which is elongated in the depth direction of the MFD 1. The positioning member 45 is used for aligning a document sheet on the platen glass 42 when the scanner 3 is used as the FBS. On an upper surface of the positioning member 45, there are marks indicating center or end positions of various sheet types such as A4 size, Legal size and the like. Further, on the upper surface of the positioning member 45, a guide surface is provided through which the original G is fed from the ADF 4, passing over the platen glass 43, and returning to the ADF 4.

The image reading unit 44 is an image sensor configured to emit light to illuminate, through the platen glasses 42 and 43, the document sheet G, and to receive the reflected light by a light receiving element via a lens. The image reading unit 44 then outputs an electrical signal corresponding to the received light. As the image reading unit 44, a CIS (Contact Image Sensor) or CCD (Charge Coupled Device) can be used. The image reading unit 44 is configured to be movable beneath the platen glasses 42 and 43 in parallel therewith by a belt drive mechanism. The image sensor is elongated in the main scanning direction (i.e., the depth direction of the MFD 1). When the ADF 4 is used, the image reading unit 44 is not driven, while when the original is placed on the platen glass 42, the image reading unit 44 is driven to move by the belt drive mechanism, in the auxiliary scanning direction which is perpendicular to the main scanning direction.

As previously described, the document cover 40 is provided with the ADF 4 which continuously feed a plurality of document sheets G one by one from the supply tray 46, via a feed path 47, to the discharge tray 48. When the document G is fed as above, the document sheet G passes through the platen glass 43, and the image reading unit 44 reads the image on the document sheet G as it passes. That is, the movement of the document sheet G serves as movement in the auxiliary scanning direction.

The cover 40 is provided with the supply tray 46 and the discharge tray 48. As shown in FIG. 1, the supply tray 46 is provided above the discharge tray 48. On the supply tray 46, a stack of document sheets G to be fed by the ADF 4 is placed in a face-up manner (i.e., with their faces bearing the images to be read are oriented upward). The stack of document sheets are placed on the supply tray 46 such that the leading edge, in the sheet feed direction, of the document sheets G are inserted in the feed path 47.

The discharge tray 48 is arranged below and spaced from the supply tray 46, and formed integrally on the upper surface of the document cover 40. Thus, the document sheet G discharged from the ADF 4 are stacked on the discharge tray 48 in a face-down manner (i.e., with their faces bearing the images oriented downward).

As shown in FIG. 3, inside the ADF 4, a sheet feed path 47 is defined to connect the supply tray 46 with the discharge tray 48. The sheet feed path 47 is defined as a laterally -facing U-shaped path in a cross-sectional side view. The sheet feed path 47 is formed as a continuous passage by material forming the main body of the ADF 4, additional guide plates and the like so as to have a predetermined width allowing the original sheet G to pass through. The sheet feed path 47 extends from the supply tray 46 to an end (i.e., the left-hand side in FIG. 3) of the document cover 40, and further extends, after curving downward to reverse the document sheet G as fed, to the reading position on the platen glass 43. The sheet feed path 47 further extends from the reading position to the discharge tray 48. As previously described, the sheet feed path has a laterally-facing U-shape in the cross-sectional side view.

As shown in FIG. 3, in the sheet feed path 47, a feeding system for feeding the document sheet G is provided. Specifically, as shown in FIG. 3, the feeding system includes a pick-up roller 49, a separation roller 50, feed rollers 51 and a discharge roller 52, and pinch rollers which are urged toward the feed rollers 51 and the discharge roller 52, respectively. It should be noted that the configuration of the feeding system described above is only an example and can be modified in various ways or replaced with suitable alternative.

At an upstream end portion of the sheet feed path 47, as described above, the pick-up roller 49 and the separation roller 50 are located. The pick-up roller 49 is rotatably provided at a tree end of an arm 54. The arm 54 and the separation roller 50 are arranged to be coaxial such that the rotary axis of the arm 54 coincides with the rotary axis of the separate roller 50. The separation roller 50 is rotatable, and separated from the pick-up roller 49 in the sheet feed direction. The separation roller 50 is arranged on the downstream side of the pick-up roller 49. The separation roller 50 is arranged to contact the sheet passing the corresponding portion of the sheet feed path 47. The pick-up roller 49 and the separation roller 50 are rotated by the driving force transmitted from a feed motor (not shown). The arm 54 is also configured to rock by the driving force transmitted from the feed motor. The pick-up roller 49 and the separation roller 50 have the same diameter, and thus are rotated to have the same circumferential velocity. Further, at a position opposite to the separation roller 50 with the sheet feed path 47 therebetween, a friction pad is provided to be urged toward the circumferential surface of the separation roller 50 so that only one sheet of the document sheet G is ted into the sheet feed path 47.

As shown in FIG. 3, there are feed rollers 51 at predetermined positions along the sheet feed path 47. In the exemplary aspects shown in FIG. 3, the feed rollers 51 are provided at a position close to and on the down stream side of the separation roller 50, at a position above a linear portion of the sheet feed path 47, at positions close to and on the downstream side and upstream side of the reading position. It should be noted that the arrangement is an example and can be modified in various ways. The feed rollers 51 are also driven by the driving force transmitted from the feed motor.

As previously described, the pinch rollers 53 are provided to face the feed rollers 51, respectively. Each pinch roller 53 is configured such that its shaft is elastically urged, for example, by a spring, so that the pinch roller 53 is urged toward the corresponding feed roller 51. Thus, when the feed roller 51 rotates, the corresponding pinch roller 53 is driven to rotate. When the document sheet G is nipped by the pair of feed roller 51 and the pinch roller 53, the original sheet G is press-contacted to the feed roller 51 by the pinch roller 53, and the rotational force is transmitted to the document sheet G.

The sheet discharge roller 52 is provided at the downstream end of the sheet feed path 47. Similar to the feed rollers 51, the discharge roller 52 is rotated by the driving force transmitted from the feed motor. Another pinch roller 53 is provided to face and urged toward the sheet discharge roller 52. The pinch roller 53 is configured such that the shaft thereof is elastically urged by, for example, a spring, so that the pinch roller 53 is urged toward the sheet discharge roller 52.

There are sensors for detecting the position of the original sheet G along the sheet feed path 47. Specifically, on the upstream side and the downstream side of the separation roller 50, a document sensor 55 and a front sensor 56 are provided. Further, at a position close to and on the upstream side of the reading position, a rear sensor 57 is provided. These sensors 55, 56 and 57 may be optical sensors, which have different types of detecting elements, with the same basic configuration. Therefore, in the following description, the document set sensor 55 will be described as a representative example.

Figure 4:
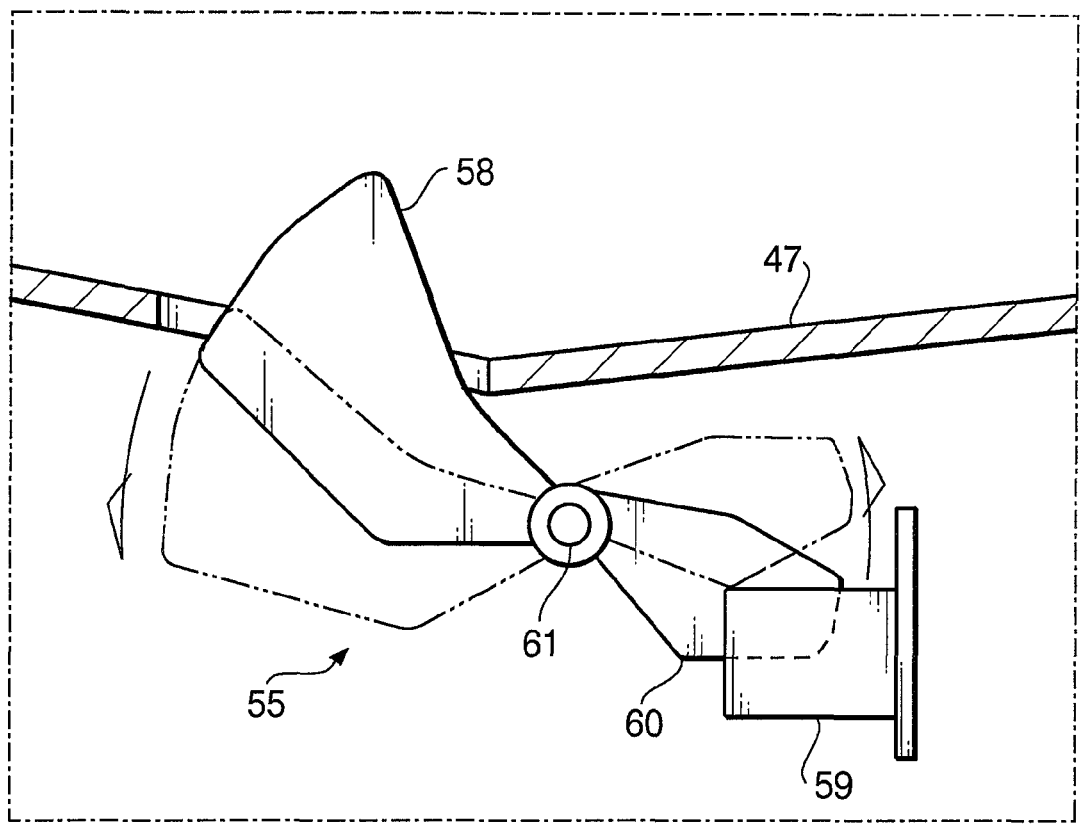
FIG. 4 is a cross sectional view of a structure of an original set sensor according to aspects of the invention.

The document sensor 55 is configured such that, as shown in FIG. 4, the detecting arm 58 protrude in the sheet feed path from the bottom of the sheet feed path 47, and a photo interrupter 59.

FIG. 4 shows an enlarged side view of the document sensor 55. The document sensor 55 includes a detecting arm 58 that rotates to retract from the sheet feed path 47 when contacting the document G fed through the sheet feed path 47 and a photo interrupter 59 that detects rotation of the detecting arm 58. The detecting arm 58 is integrally formed with a shielding part 60 that is detected by the photo interrupter 59, and is secured rotatably about a shaft 61. The detecting arm 5 8 is urged by an urging member (not shown) such as a spring, in the direction where the detecting arm 58 protrudes inside the sheet feed path 47 (i.e., clockwise in FIG. 4). Therefore, in a neutral state, the detecting arm 58 is located at a position indicated by solid lines in FIG. 4. In this state, the detecting arm 58 protrude in the sheet feed path 47, and a shielding part 60 is located between a light emitting unit and light receiving unit of the photo interrupter 59. At this stage, light transmission of the photo interrupter 59 is cut, and the document set sensor 55 is OFF.

When a stack of document sheets G is placed on the supply tray 46, the document sheets G contact the detecting arm 58 and rotate the detecting arm 58 to be retracted from the sheet feed path 47. Then, the shielding part 60 rotates (counterclockwise in FIG. 4) and moved out of the position between the light emitting unit and the light receiving unit of the photo interrupter 59, as shown by dotted lines in FIG. 4.T*hen*, the light is transmitted inside the photo interrupter 59, and the document set sensor 55 is ON. As above, depending on whether the document set sensor 55 is OFF or ON, whether the stack of document sheets G are placed (i.e., the sensor output is OFF) on the supply tray 46 or not (i.e., the sensor output is ON) is detected.

A front sensor 56 provided at a position close to and on the downstream side of the separation roller 59 is for detecting a leading edge and a trailing edge of a document sheet G supplied to the sheet feed path 47 depending on a change in the ON/OFF states. When the state of the front sensor 56 is changed from ON to OFF, passage of the leading edge of the document sheet G at the sensor position is detected, and when the state of the front sensor 56 is changed from OFF to ON, passage of the trailing edge of the document G is detected. By monitoring the location of the document G, for example, based on the number of revolution of the feed roller 51 using an encoder or the number of driving steps of the feed motor, it is judged whether the leading edge of the document G has been fed to contact the predetermined feed roller 51. Then, using the predetermined feed roller 51, a skew condition (i.e., a condition where the sheet is fed as inclined) can be corrected.

A rear sensor 57 is arranged at a position close to and on the upstream side of the reading position. Based on the change between ON/OFF states, the leading edge and trailing edge of the document sheet G fed through the sheet feed path 47 can be detected. By monitoring the location of the document sheet G, for example, based on the number of rotation of the feed roller 51 using an encoder or the number of driving steps of the feed motor after the rear sensor detected the leading edge or trailing edge of the document sheet G, it is judged whether the leading edge or trailing edge of the document sheet G has been fed to the image reading position. Image reading of the image reading unit 44 is controlled based on the output signal of the rear sensor 57. That is, when the leading edge of the document sheet G has reached the reading position, the image reading operation is started, and when the trailing edge of the document sheet G has reached the reading position, the image reading operation is finished.

Next, image reading operation by the scanner 3 will be described. As previously described, the scanner 3 is capable of reading an image as the FBS, alternatively, using the ADF 4. When the ADF 4 is used, the document cover 40 is closed the original placing table 41, and the multiple document sheets G to be scanned is placed on the supply tray 46. The stack of document sheets G are placed in a face-up state, i.e., the image carrying surfaces being oriented upward. As the document sheet(s) G is(are) placed, the original set sensor is turned into an ON state. It should be noted that the document sheet G may be a single sheet or multiple sheets. It, for example, multiple sheets of the same size are scanned, the sheets are stacked with each image carrying surface being located upward and placed on the supply tray 46.

It the start button of the operation panel 5 is depressed and the scanning is instructed, the carriage motor, feed motor and the like are driven so that the pick-up roller 49, separation roller 50, feed rollers 51 and sheet discharge roller 52 are rotated at predetermined timings, respectively. At the same time, the arm 54 is moved downwards so that the pick-up roller 49 is contacted on the top sheet of the document sheets G placed on the supply tray 46. Then, by the rotational force of the pick-up roller 49 and separation roller 50, the document sheets G are sequentially separated and fed into the sheet feed path 47, one by one from the top of the stack of document sheets. The document sheet G fed into the sheet feed path 47 is driven to the reading position as guided by the sheet feed path 47 and the image thereon is scanned by the image reading unit 44 which stays below the reading position. Then, the document sheet G is discharged to the discharge tray 48.

When the scanner 3 is used as the FBS, the document cover 40 is opened and a document sheet G is placed on the platen glass 42 at a predetermined position. Then, as the document cover 40 is closed, the document sheet G is fixed at the predetermined position on the platen glass 42. In this case, the image reading unit 44 emits light to the platen glass 42 in the vicinity of the positioning member on the platen glass 42 when the document cover 40 is closed. It the document sheet G is placed on the platen glass 42, the light is reflected by the document sheet G, and the reflected light is incident on the image reading unit 44. It no document sheet G is placed on the platen glass, the light passes through the platen glass 42 and emerges outside since the document cover 40 has not been completely close. In such a case, the image reading unit 44 does not receive the reflected light. Based on the difference of the intensity of the received light, it is determined whether the document sheet G is placed on the platen glass 42. In other words, the image reading unit 44 functions as the document set sensor when the scanning 3 is used as the FBS.

When the start key of the operation panel 5 is depressed and the start of the scanning is instructed, the carriage motor, feed motor and the like are driven and the image reading unit 44 is moved along the platen glass 42. With this movement, the image reading unit 44 scans the image on the document sheet G placed on the platen glass 42 and the image is obtained.

Next, the opening/closing mechanism of the scanner 3 will be described.

Figure 5:
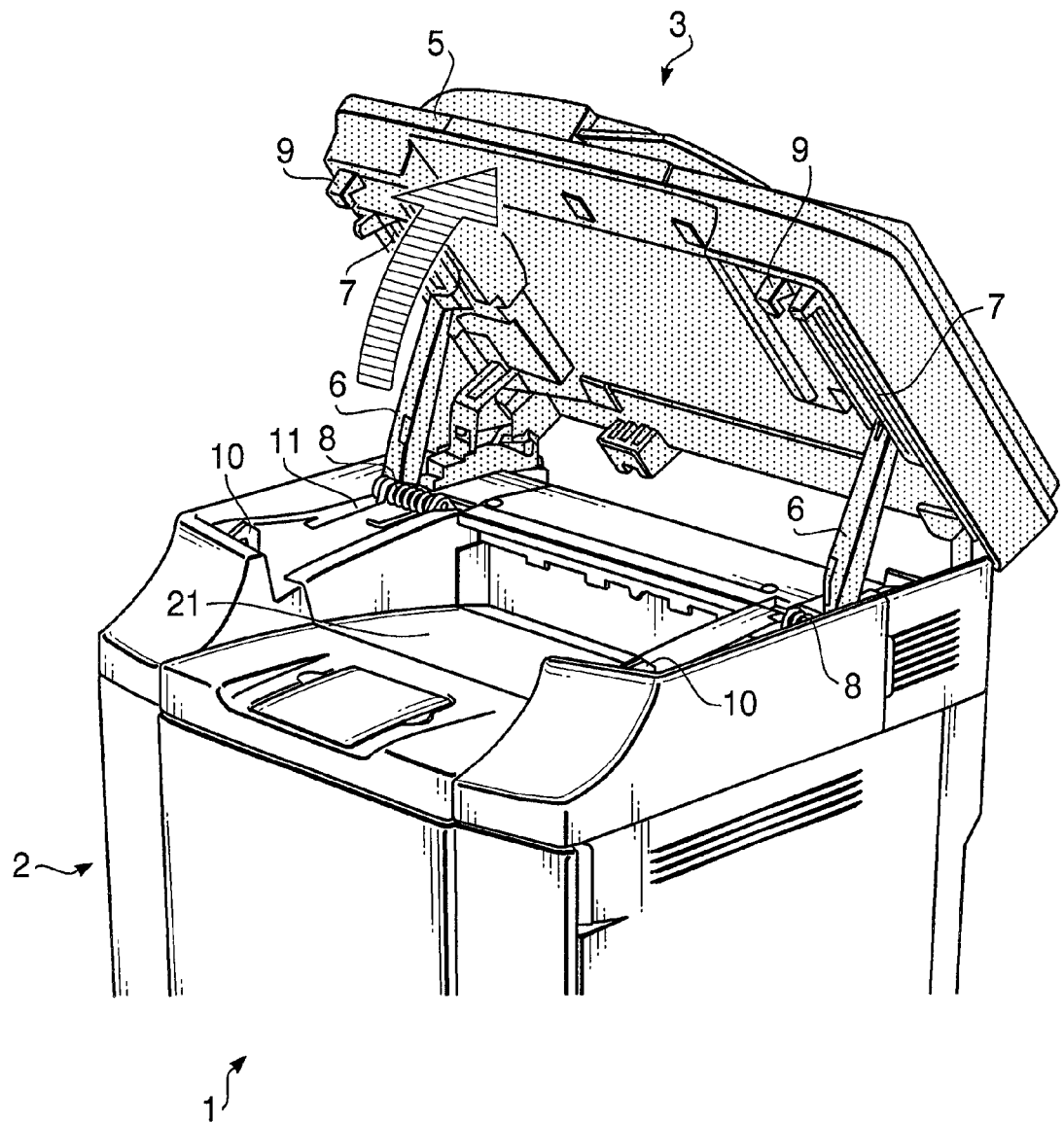
FIG. 5 is a perspective view of the MFD when the scanner is opened.

As shown in FIG. 5, the scanner 3 is openably/closably provided on the printer 2 via a hinge mechanism. Specifically, the scanner 3 is connected to the printer 2with the hinge mechanism provided on the rear side thereof. Thus, the printer 3 is openable such that the rear side is a fulcrum side and the front side is a distal side, and the front side is moved upwards/downwards about the rear side, with respect to the top surface of the printer 2. With this configuration, the scanner 3 is openable/closable to expose the top surface of the printer 2.

When the scanner 3 is opened, the upper portion inside the printer 2 is exposed to outside. The discharge tray 21 is openable/closable relative to the main body of the printer 2. Thus, by opening the scanner 3 and further by opening the discharge tray 21, the user can access the components inside the printer 2. Such an access to the inside components of the printer 2 is required for maintenance such as replacement of the photoconductive drum and/or handling a sheet jam and the like.

On both sides of the upper surface of the printer 2, a pair of supporting members 6 is provided. The supporting members 6 are elongated rod-like members. The proximal end of each support member 6 is rotatably fixed on the upper surface of the printer 2, and the distal end of each support member 6 is connected to a guide rail 7 formed on the lower surface of the scanner 3 so that the distal end of each support member 6 slides along the guide rail 7.

On the front side of the printer unit 2 and the scanner 3, a lock mechanism is provided which is engaged when the scanner 3 is closed relative to the printer 2. The lock mechanism includes a pair of hooks provided on the lower surface of the scanner 3 at the distal end side (i.e., the front side), and a pair of lock levers corresponding to the pair of hooks. Further, on the upper surface of the printer 2, an open/close sensor 11 for detecting the open/close state of the scanner 3 relative to the printer 2 is provided.

Figure 6A:
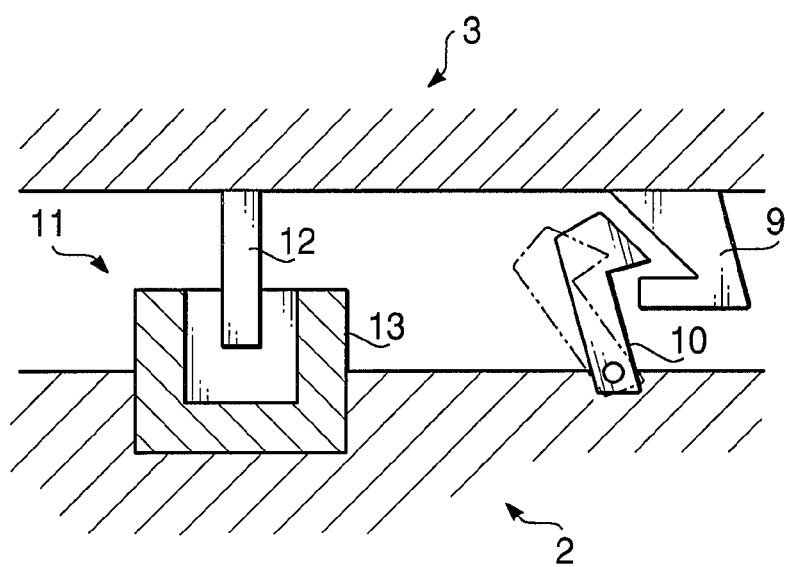
FIGS. 6A and 6B show a configuration of a hook, a rock lever and an open/close sensor according to aspects of the invention.
Figure 6B:
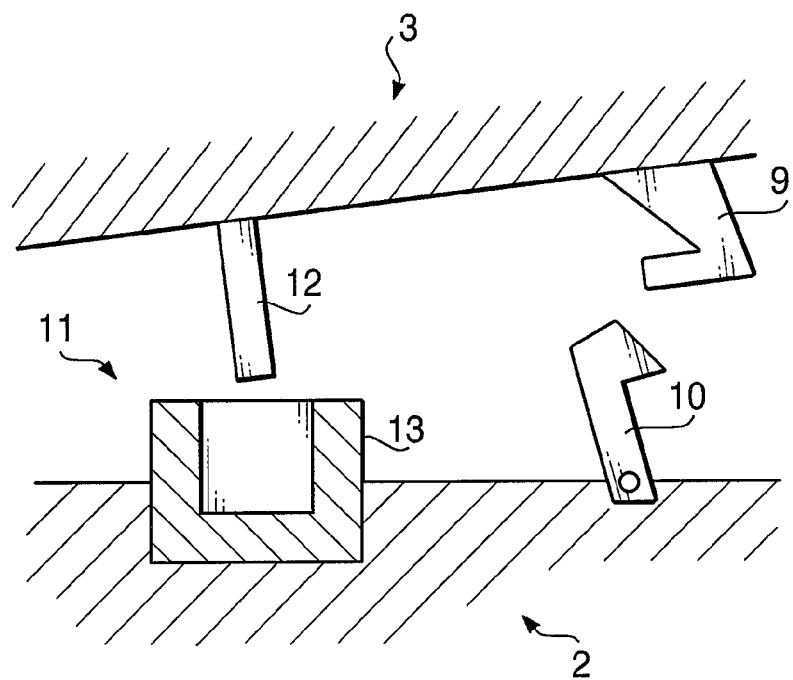

FIGS. 6A and 6B schematically show a configuration of the lock mechanism and the open/close sensor 11. The hook 9 protrudes downward from the bottom surface of the scanner 3. On the upper surface of the printer 2, a lock lever 10 which can be engaged with the hook 9 is protruded. The lock lever 10 is rockable so as to fall down on the upper surface of the printer 2. The lock lever 10 is urged by an elastic member such as a spring so that, in a neutral state, the lock lever 10 stands by the force of the elastic member and can engage with the hook 9.

As shown in FIG. 6A, when the scanner 3 is closed relative to the printer 2, the hook 9 engages with the lock lever 10. With this engagement, opening of the scanner 3 due to relatively small external force or urging force of the support member 6 can be prevented. Further, with the engagement, chattering of the open/close sensor 11 can be prevented. When the scanner 3 is lifted up, the lock lever 10 is rocked against the urging force applied to the lock lever 10 and is disengaged from the hook 9. As such, the engagement of the hook 9 with the lock lever 10 is released. It the scanner 3 is further lifted up, as shown in FIG. 6B, the scanner 3 is opened relative to the printer 2.

The open/close sensor 11 is an optical sensor. As shown in FIGS. 6A and 6B, a detection member 12 protruding downward from the bottom surface of the scanner 3 is detected by a photo interrupter 13 to determine whether the scanner 3 is opened/closed relative to the printer 2. As shown in FIG. 6A, when the scanner 3 is closed relative to the printer 2, the detection member 12 is located between the light emitting unit and the light receiving unit of the photo interrupter 12. Thus, the light transmission inside the photo interrupter 12 is cut, and thus the open/close sensor 11 is in the OFF status. While, as show in FIG. 6B, it the scanner 3 is opened relative to the printer 2, the detection member is spaced from the photo interrupter. Thus, the light is transmitted inside the photo interrupter 12, and the open/close sensor 11 is in the ON state. By the ON/OFF states of the open/close sensor 11, the close/open status of the scanner 3 can be detected.

Figure 7:
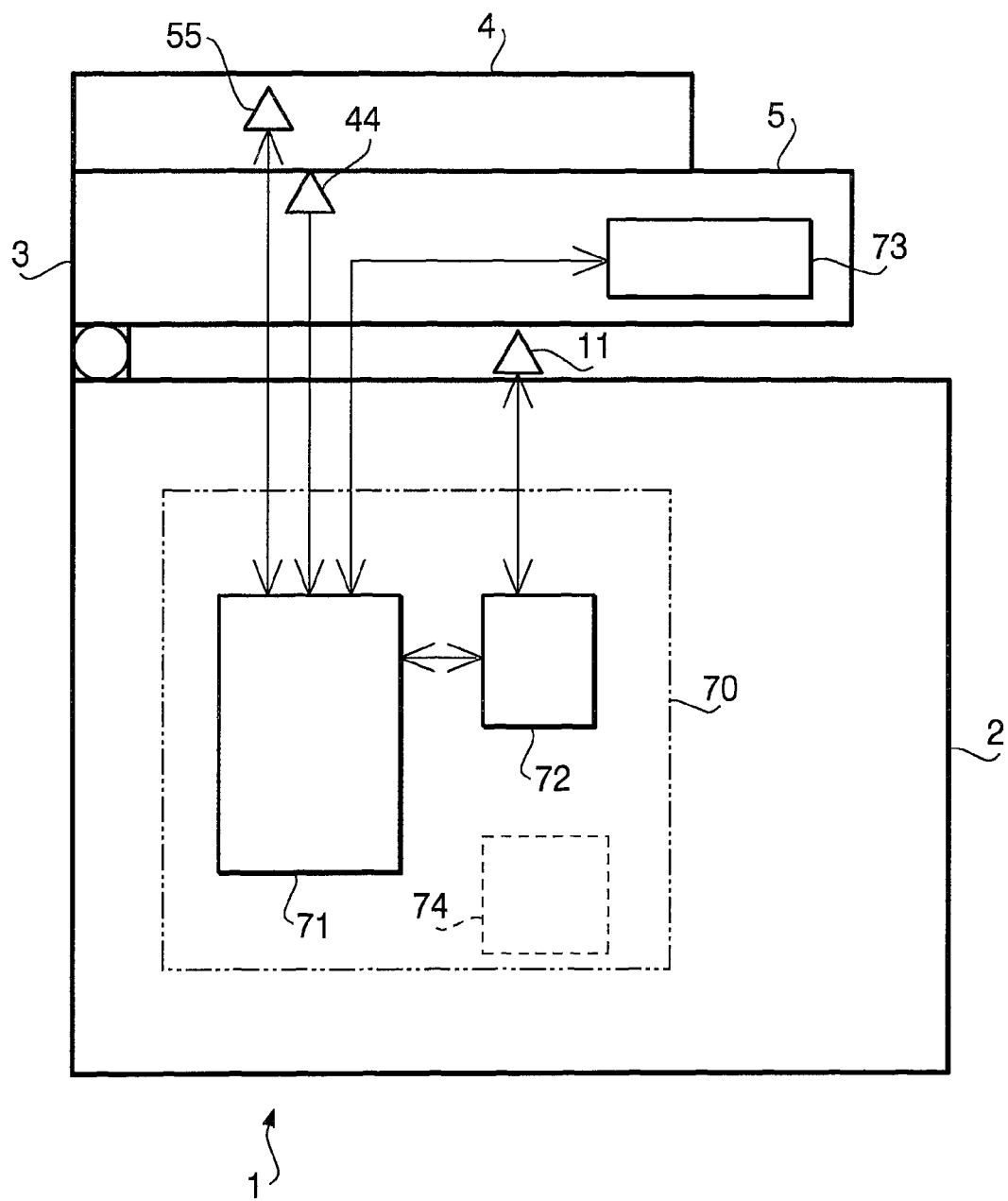
FIG. 7 is a block diagram showing a configuration of a control unit of the MFD according to aspects of the invention.

Next, a control unit 70 of the MFD 1 will be described with reference to FIG. 7. As shown in FIG. 7, the printer 2 includes the control unit 70. The control unit 70 includes a main controller 71 that controls the operations of the printer 2 and the scanner 3, and the printer controller 72 that controls the operation of the printer 2. The main controller 71 may be configured as a micro computer provided with a CPU (Central Processing Unit), a ROM (Read Only Memory), a RAM (Random Access Memory), an EEPROM (Electrically Erasable and Programmable ROM). The ROM stores various programs for controlling various operations of the MFD 1. The RAM serves as a storage area and work area for temporarily storing various pieces of data when the CPU executes the programs.

The operation panel 5 is provided with an input control unit 73 that outputs predetermined signals when the keys of the operation panel 5 are depressed, respectively. The input control unit 73 is electrically connected to the main controller 71, which controls the printer unit 2 and/or the scanner 3 based on the output signals output by the input control unit 73. The main controller 71 receives an output signal of the original set sensor 55 of the ADF 4 and an output signal of the image reading unit 44.

The printer controller 72 is provided with an ASIC (Application Specific Integrated Circuit) and driving circuit, and is communicatably connected with the main controller 71. The ASIC generates phase excitation signal to be applied to the motor in accordance with the CPU instruction. The ASIC is connected with the open/close sensor 11, and receives the signal output by the open/close sensor 11.

The control unit 70 configured as above controls the input through the operation panel 5 in association with opening/closing of the scanner 3. Hereinafter, the input control in association with the opening/closing operation of the scanner 3 will be described referring to a flowchart shown in FIG. 8.

Figure 8:
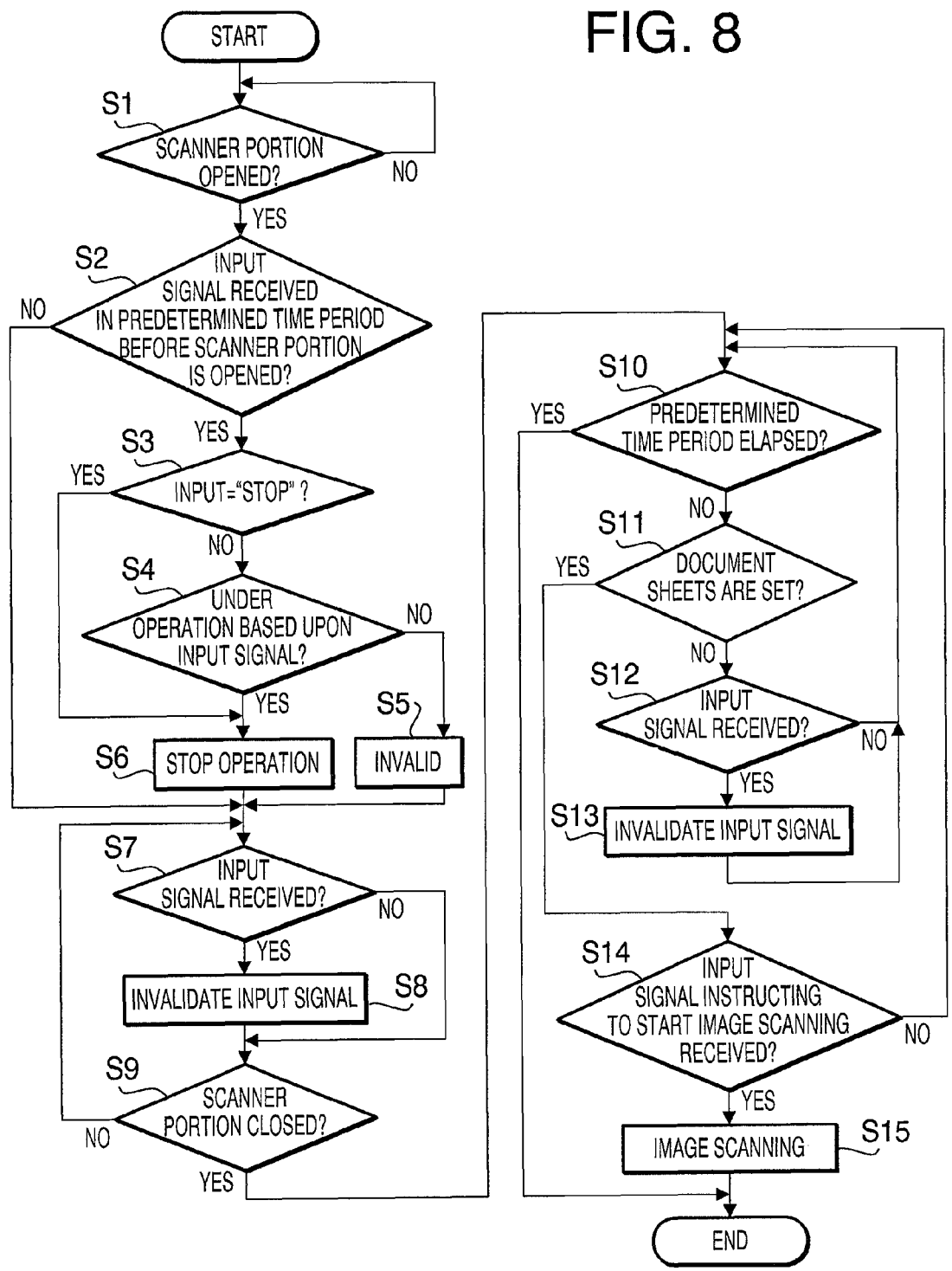
FIG. 8 shows a flowchart illustrating a control executed by the control unit in accordance with the open/close status of the scanner.

For the maintenance of the photoreceptor belt 27 or dealing with troubles such as sheet jam, the scanner 3 is opened relative the printer 2 as shown in FIG. 2. When the scanner 3 is opened, the user may touch the free end portion of the scanner 3, that is, the user may hold the operation panel 5 of the scanner 3. In such a case, there is a possibility that the user may unintentionally depress the operation key(s) of the operation panel 5, and input an unintended command. The flowchart shown in FIG. 8 shows an input control process that handles an unintentional input.

When the scanner 3 is opened, the open/close sensor 11 is ON. That is, when the status of the open/close sensor 11 is changed from OFF to ON, the control unit 70 determines that the scanner 3 is opened (S1: YES). Then, the control unit 70 judges whether an input signal was received within a predetermined period before the open/close sensor 11 has been turned ON (S2). This predetermined period is set taking a period necessary for the user to hold the portion of the scanner 3 around the operation panel 5 and finish opening the scanner 3.

If the control unit 70 has received an input signal during the predetermined period before the scanner 3 is opened (S2: YES), the control unit 70 judges whether the input signal is a "stop "instruction (S3). This "stop "instruction can be input when the user depresses the stop key of the operation panel 5. It is assumed that the "stop "instruction is made in order to stop a currently executed operation when the user opens the scanner 3. Even if the "stop "instruction is an unintended one, since the scanner 3 has been opened, it may accept the instruction. Therefore, the control unit 70 may accept the input instructing to "stop "the current operation from the input controller 73 regardless of whether the open/close sensor 11 is in an ON or OFF state (S3: YES). If the input signal is a "stop "instruction, the control unit 70 stops the operation currently being executed by the printer 2 or the scanner 3 (S6).

If the input signal is an instruction other than the "stop "instruction (S3: NO), the control unit 70 judges whether the printer 2 or the scanner 3 has been controlled to operate in accordance with the input signal (S4). If the printer 2 or the scanner 3 has already been controlled to operate in accordance with the input instruction (S4: YES), the control unit 70 stops the operation (S6). If the printer 2 or the scanner 3 has not yet been controlled in accordance with the input instruction (S4: NO), the control unit 70 invalidate the input signal received from the input controller 73 (S5). It should be noted that "invalidate "means that the control unit 70 receives the input signal from the input controller 73 but does not execute the operation in accordance with the input signal.

It the control unit 70 receives the input signal after the scanner 3 has been opened (S7: YES), the control unit 70 ignores (rejects) the input signal (S8). It should be noted that if the input signal is a "stop "instruction, the control unit 70 may accept the input signal. However, since the operations of the printer 2 and the scanner 3 have been stopped, the control unit 70 does not stop the operations again. Thereafter, the control unit 70 ignores any input signal while the scanner 3 is opened (S9: NO). If the control unit 70 does not receive the input signal (S7: NO), step S9 is executed, and if the scanner 3 is opened (S9: NO), step S7 is executed. Thus, until the scanner 3 is closed, step S7 is executed, and even if a signal is received (S7: YES), the received signal is invalidated (S8).

Optionally, the control unit 70 may be configured to output warning sound when the input signal from the input controller 73 is ignored (rejected). To output a warning sound, the control unit 70 may optionally be implemented with a warning unit 74 (indicated by broken lines) which may include a speaker and a warning sound creating unit. With such a configuration, if the user intentionally inputs a command through the operation panel 5 and the warning sound is output by the warning unit 74, the user will hear the warning sound and recognize that the input has been rejected and that the operation will not be executed.

After the maintenance work is finished, the user closes the scanner 3. Again, when the user closes the scanner 3, it is likely that the user holds the distal end of the scanner 3 (i.e., the portion around the operation panel 5). Further, in order to completely close the scanner 3, the user may possibly press the upper surface of the scanner 3. Thus, when the scanner 3 is closed, there is a possibility that the user may unintentionally depress the buttons on the operation panel 5 and unintentional instructions may be input.

When the scanner 3 is closed, the open/close sensor II outputs a signal that indicates that the scanner 3 is in the closed state (i.e., the open/close sensor II is in the OFF state) (S9).

The control unit 70 judges whether a predetermined period has passed since a signal indicating that the scanner is in the closed state has been received (S10). The predetermined period is set taking a time period from a time when the user holds or starts pressing the portion around the operation panel 5 of the scanner 3 to a time when the scanner 3 is completely closed and the user release her hand from the operation panel 5. The control unit 70 returns to operation in a normal state after it receives the signal indicating that the scanner 3 has been closed and the predetermined period has passed. In the normal state, the control unit 70 operates to control the scanner 3 or the printer 2 in accordance with the input through the operation panel.

Even if the predetermined period has not passed after the signal indicating the scanner 3 is closed, the control unit 70 judges whether the stack of document sheets G have been set for the scanner 3 (S11). As previously described, the document sheet G is placed on the platen glass 42 of the scanner 3 and the cover 40 is closed, the image reading unit 44 detects absence/presence of the document sheet G thereon. Further, if the multiple document sheets G are placed on the supply tray 46 of the ADF 4 of the scanner 3, the document set sensor 55 outputs the signal indicative of the presence of the original sheet G. Such a state can be based on the user's intent.

When the signal indicative of the presence of the stack of document sheets G is output by the sensor 55, the control unit 70 operates such that, when the signal indicative of the presence of the original sheets G, if the input signal instructing "start scanning "is received from the input controller 73 (S14), the control unit 70 immediately controls the scanner 3 to start reading the image using the FBS or ADF 4 (S15). The status that the stack of document sheets G are set indicates the user's intent, and the input of the "start scanning "instruction is also based on the user's intent. That is, in the above case, the user closes the scanner 3, sets the document sheet G immediately, and operates the operation panel to start scanning. In such a case, it the control unit 70 receives the signal indicating the presence of the stack of document sheets G before the predetermined time has passed since the control unit 70 received the signal indicating the scanner 3 is in the closed state from the open/close sensor 11, the control unit 70 accepts the input instruction indicating "start scanning", and controls the scanner 3 to start scanning. It should be noted that the input of "start scanning "is completed when the start button of the operation panel 5 is depressed, and the input controller 73 outputs the input signal instructing to "start scanning "to the control unit 70.

When the signal indicating the presence of the stack of document sheets G has not been received, if an input signal is received from the input controller 73, the control unit 70 ignores (rejects) the input signal (S13). In this case, similar to S8, if the input signal is a "stop "instruction, it may be accepted. The control unit 70 keeps ignoring the input signal unless the stack of document sheets G are set (S11: YES) or the predetermined period has elapsed (S10: YES). It is noted that, when the input signal is ignored (rejected), the warning sound may be output. When the predetermined period has passed (S10: YES) after the signal indicating that the scanner 3 is in the closed state has been received, the control unit 70 returns to its normal operation, in which the control unit 70 controls the printer unit 2 or the scanner 3 to operate in accordance with the input through the operation panel 5.

As described above, when the scanner 3 is opened, the open/close sensor 11 outputs the signal indicating that the scanner 3 is in the open state. Then, the control unit 70, which receives the signal, rejects the input through the operation panel 5. Therefore, after the scanner 3 is opened, the printer 2 or the scanner 3 will not be operated in accordance with the input through the operation panel 5. Further, the control unit 70 invalidates the input received within a predetermined period before it receives the signal indicating that the scanner 3 is in the open state. Therefore, the unintentional input through the operation panel 5 which was input immediately before the scanner 3 was opened can be invalidated. With this configuration, the operation of the printer 2 or the scanner 3 based on the unintentional input can be prevented. Furthermore, if the operation in accordance with the input through the operation panel 5 is being executed, the control unit 70 stop the operation when the scanner 3 is opened. Therefore, a situation can be prevented if the scanner 3 is opened during the operation of the printer 2 or the scanner 3 and the operation is continued after the scanner 3 is opened.

When the scanner 3 is closed, the open/close sensor 11 output the signal indicative of the closed state of the scanner 3. Then, the control unit 70 receives the signal, and accepts the input through the operation 5 panel after the predetermined period has elapsed since the receipt of the signal indicating the closed state of the printer 3. Therefore, a situation can be prevented where the control unit 70 controls the printer unit 2 or the scanner 3 in accordance with an unintentional input which is input immediately after the scanner 3 is closed.

In the above-described illustrative aspects, when the control unit 70 receives the signal indicating that the scanner 3 is in the open state from the open/close sensor 11, the control unit 70 invalidates the input that was made within a predetermined period before the receipt of the signal from the open/close sensor 11, and does not execute the operation in accordance the input made within that period. According to other aspects, when the control unit 70 receives the signal indicating that the scanner 3 is in the open state, the control unit 70 rejects the input after the receipt of the signal indicating the open state of the scanner 3, without referring back to the predetermined period before the receipt of the signal indicating the open state of the scanning 3.

What is claimed is:

1. An image forming apparatus, comprising:
   a main body of the image forming apparatus;
   an upper portion provided on the main body of the image forming apparatus, the upper portion being openable/closable relative to the main body;
   a sensor configured to detect an open/close state of the upper portion relative to the main body and output an open/close state signal;
   an operation panel configured to input instructions to control the image forming apparatus;
   a receiving unit configured to receive instructions from the operation panel; and
   a controller coupled to the sensor and the receiving unit and configured to control operation of the image forming apparatus, wherein after the upper portion has been opened, the controller determines a length of time between a receipt of the operational instruction and when the sensor detected that the upper portion was opened, and invalidates an operational instruction if the controller determines that the operational instruction has been received by the receiving unit from the operation panel within a predetermined period before the sensor detected that the upper portion was opened;
   wherein the upper portion includes an image reading unit configured to scan an image of a document sheet and a document sheet sensor configured to detect presence/absence of the document sheet to be scanned;
   wherein, when the controller receives a signal indicating presence of the document sheet from the document sheet sensor, the controller accepts an operational instruction received by the receiving unit to start scanning the image on the document sheet during a predetermined period after the controller received the closed state signal; and
   wherein, when the controller has not received the signal indicating presence of the document sheet from the document sheet sensor within the predetermined period after the controller received the closed state signal, the controller rejects the operational instruction if the controller determines that the operational instruction has been received by the receiving unit from the operation panel within the predetermined period after the controller received the closed state signal.

2. The image forming apparatus according to claim 1, wherein the controller accepts the operational instruction when a predetermined period has elapsed after receiving a closed state signal.

3. The image forming apparatus according to claim 1,
   wherein the image reading unit includes a flatbed scanner, and
   wherein the document sheet sensor is configured to detect absence/presence of the document sheet on the flatbed scanner.

4. The image forming apparatus according to claim 1,
   wherein the image reading unit includes a sheet feeder configured to feed the document sheet from a supply tray to a discharge unit via a reading position at which the document sheet is scanned, and
   wherein the document sheet sensor detects absence/presence of the document sheet on the supply tray.

5. The image forming apparatus according to claim 1, wherein the controller is configured to accept a stop operational instruction from the operation panel regardless of a open/close state detected by the sensor.

6. The image forming apparatus according to claim 1, wherein the operation panel is provided on a distal end portion of the upper portion.

7. The image forming apparatus according to claim 6, wherein the upper portion is configured to be movable in an upper direction relative to the main body of the image forming apparatus, the operation panel being provided on an upper surface of the upper portion.

8. The image forming apparatus according to claim 1,
   wherein the operational instruction received by the receiving unit includes an instruction to form an image.

9. The image forming apparatus according to claim 1,
   further including a warning unit that generates a warning sound when the controller invalidates the operational instruction received by the receiving unit.

10. An image forming apparatus, comprising:
    a main body of the image forming apparatus;
    an upper portion provided on the main body of the image forming apparatus, the upper portion being openable/closeable relative to the main body;
    a sensor configured to detect an open/close state of the upper portion relative to the main body and output an open/close state signal;
    an operation panel configured to input instructions to control the image forming apparatus;
    a receiving unit configured to receive operational instructions from the operation panel; and
    a controller coupled to the sensor and the receiving unit and configured to control operation of the image forming apparatus,
    wherein, when the control unit receives an open state signal, the controller determines a length of time between a receipt of the operational instruction and when the sensor detected that the upper portion was in an open state, and rejects the operational instruction if the controller determines that the operational instruction has been received by the receiving unit within a predetermined period before the sensor detected that the upper portion was in an open state, and
    wherein, when a predetermined period has passed after the control unit received a close state signal from the sensor, the controller accepts an operational instruction received by the receiving unit;

wherein the upper portion includes an image reading unit configured to scan an image of a document sheet and a document sheet sensor configured to detect presence/absence of the document sheet to be read;

wherein, when the control unit receives a signal indicating presence of the document sheet from the document sheet sensor, the control unit accepts an operational instruction received by the receiving unit to start reading the image on the document sheet during a predetermined period after the controller received the closed state signal; and wherein, when the controller has not received the signal indicating presence of the document sheet from the document sheet sensor within the predetermined period after the controller received the closed state signal, the controller rejects the operational instruction if the controller determines that the operational instruction has been received by the receiving unit from the operation panel within the predetermined period after the controller received the closed state signal.

11. The image forming apparatus according to claim 10, wherein the image reading unit includes a flatbed scanner, and wherein the document sheet sensor is configured to detect absence/presence of the document sheet on the flatbed scanner.

12. The image forming apparatus according to claim 10, wherein the image reading unit includes an auto sheet feeder configured to feed the document sheet from a sheet supply tray to a sheet discharge unit via a reading position at which the document sheet is scanned, and wherein the document sheet sensor detects absence/presence of the document sheet on the sheet supply tray.

13. The image forming apparatus according to claim 10, wherein the controller is configured to accept a stop operational instruction from the receiving unit regardless of a open/close state detected by the sensor.

14. The image forming apparatus according to claim 10, wherein the operation panel is provided on a distal end portion of the upper portion.

15. The imaging apparatus according to claim 14, wherein the upper portion is configured to be movable in an upper direction with respect to the main body of the image forming apparatus, the operation panel being provided on an upper surface of the upper portion.

16. The image forming apparatus according to claim 10, wherein the operational instruction received by the receiving unit includes an instruction to form an image.

17. The image forming apparatus according to claim 10, further including a warning unit that generates a warning sound when the controller invalidates the operational instruction received by the receiving unit.

18. The image forming apparatus according to claim 10, wherein, when the control unit receives an open state signal, the controller rejects the operational instruction received by the receiving unit.

* * * * *